United States Patent [19]
Fedorov et al.

[11] Patent Number: 5,884,871
[45] Date of Patent: Mar. 23, 1999

[54] USE OF ABSORBING WALLS FOR LAMINAR FLOW CONTROL

[75] Inventors: Alexander V. Fedorov, Zhukovsky, Russian Federation; Norman D. Malmuth, Newsbury Park, Calif.

[73] Assignee: Boeing North American, Inc., Seal Beach, Calif.

[21] Appl. No.: 827,403

[22] Filed: Mar. 27, 1997

[51] Int. Cl.[6] .................................................. B64C 21/00
[52] U.S. Cl. ........................... 244/200; 244/130; 244/204
[58] Field of Search .................................. 244/204–209, 244/130, 200, 198, 100, 133

[56] References Cited

U.S. PATENT DOCUMENTS

| | | | |
|---|---|---|---|
| 3,261,576 | 7/1966 | Valyi | 244/130 |
| 3,713,157 | 1/1973 | August | 343/18 |
| 3,849,178 | 11/1974 | Feldman | 117/72 |
| 4,392,624 | 7/1983 | Myer | 244/158 |
| 4,522,360 | 6/1985 | Barnwell et al. | 244/130 |
| 4,802,642 | 2/1989 | Mangiarotty | 244/200 |
| 4,907,765 | 3/1990 | Hirschel et al. | 244/200 |
| 5,030,597 | 7/1991 | Ogata et al. | 244/133 |
| 5,069,403 | 12/1991 | Marentic et al. | 244/130 |
| 5,080,879 | 1/1992 | Nadkarni et al. | 244/133 |
| 5,114,099 | 5/1992 | Gao | 244/130 |
| 5,133,516 | 7/1992 | Marentic et al. | 244/130 |
| 5,167,387 | 12/1992 | Hartwich | 244/200 |
| 5,296,288 | 3/1994 | Kourtides et al. | 428/262 |
| 5,316,032 | 5/1994 | De Coux | 244/209 |
| 5,348,256 | 9/1994 | Parikh | 244/209 |
| 5,538,201 | 7/1996 | Gerhardt | 244/204 |
| 5,618,363 | 4/1997 | Mullender et al. | 244/130 |

*Primary Examiner*—Galen L. Barefoot
*Attorney, Agent, or Firm*—Lawrence N. Ginsberg

[57] ABSTRACT

A method is provided for hypersonic laminar flow control which uses the effect of boundary layer stabilization by an ultrasonically transparent coating. A hypersonic body surface is covered by the coating which absorbs the flow disturbance energy and does not trip the boundary layer flow. In one embodiment, the coating is made from a porous material of regular structure containing cylindrical blind microholes normal to the body surface. In another embodiment, the porous material has random distributions of pore shape and orientation. Extraction of the flow disturbance energy by pores causes stabilization of the boundary layer on the coated surface and leads to laminar-turbulent transition delay. The method can be used to decrease the aerodynamic drag of hypersonic vehicles and reduce heat transfer on vehicle surfaces.

19 Claims, 5 Drawing Sheets

FIG. 4a
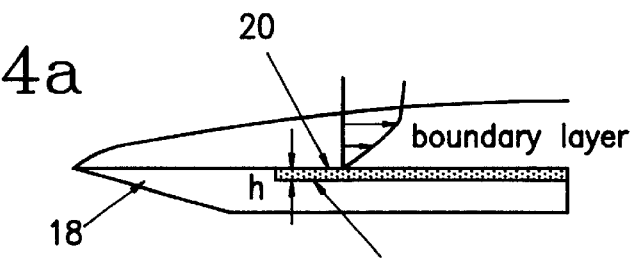
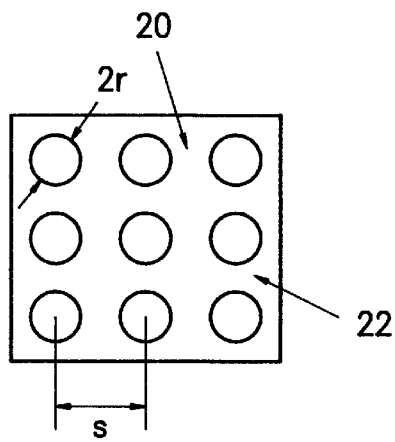
FIG. 4b
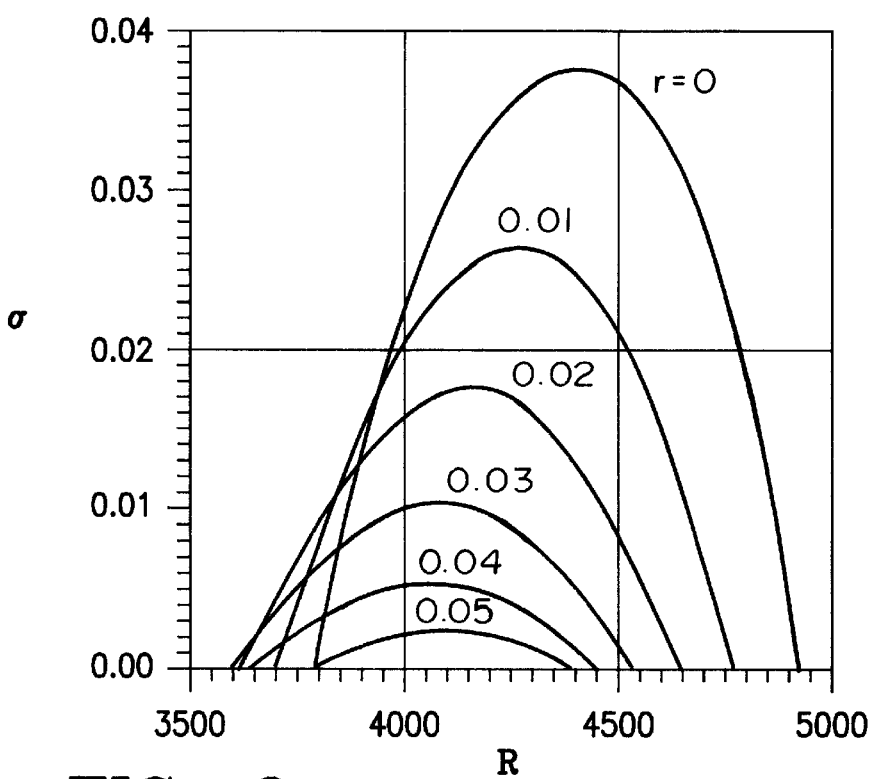
FIG. 6

Determine distributions of absorptive material parameters $n(x,z)$, $r(x,z)$ and $h(x,z)$ on hypersonic body surface range, $x_{te}(z)>x>x_0(z)$, which satisfy said constraints and provide maximum delay of said transition onset locus $x_{tr}(z)$:

```
┌─────────────────────────────────────────────┐
│ Determine a

USE OF ABSORBING WALLS FOR LAMINAR FLOW CONTROL

The Government has rights in this invention pursuant to AFOSR Contract No. F49620-92-C-0006 awarded by the United States Air Force.

BACKGROUND OF THE INVENTION

1. Field of the Invention

The present invention relates to the field of the hypersonic laminar flow control and particularly to laminar flow control on hypersonic vehicle surfaces.

2. Description of the Related Art

In many practical cases, laminar-turbulent transition is due to amplification of unstable modes in the boundary layer. At hypersonic speeds, boundary layer instability relates to the second mode which is the result of an inviscid instability present due to a region of supersonic mean flow relative to the disturbance phase velocity. It is associated with the family of trapped acoustic waves propagating in a waveguide between the wall and the local sonic line. The second mode induces pressure disturbances of frequency>50 kHz belonging to the ultrasonic band. The delay in laminar-turbulent transition can lead to substantial performance gains for hypersonic aircraft and space vehicles. A method is needed to provide cost effective, passive and easily integratable delay of such laminar and turbulent transition.

U.S. Pat. No. 4,802,642 entitled "Control of Laminar Flow in Fluids by Means of Acoustic Energy" provides a method for laminar flow control involving infusion of the acoustic energy into the boundary layer. This active method of laminar flow control requires a complicated system for acoustic generators and its control to achieve stabilization of Tollmien-Schlichting waves. It is difficult to use such a method for hypersonic vehicles due to high levels of thermal loads on their skin.

A patent search has also revealed the following patents:

U.S. Pat. No. 4,392,624, entitled "Implanted Boundary Layer Trip" involves an improved technique for controlling the ablative symmetry of a re-entry vehicle nose. Carbon-carbon material is placed relatively far upstream from the boundary layer instability region and cannot be used for laminar flow control.

U.S. Pat. No. 's 4,907,765, 5,907,765, and 5,069,403 provide drag reduction on surfaces with turbulent flows. Conformal drag reduction articles have surfaces with a riblet configuration which reduces turbulent friction. Such articles (films, fiber composite materials, etc.) are not effective for laminar flow control. Surface riblets produced by these films do not absorb disturbance energy from a laminar boundary layer. Riblets could trip laminar flow rather than stabilize it. Due to high thermal loads on turbulent hypersonic surfaces, it is very difficult to utilize the methods described in these patents for hypersonic vehicles.

U.S. Pat. No. 5,167,387 entitled "Porous Airfoil and Process" discloses a process for making airfoils self-adaptive to dissimilar flow conditions. It is attained by placing cavities with contoured barrier walls beneath a porous upper and lower surface patch that stretches over the nominal chord of an airfoil. These cavities permit the high pressures occurring in the nose and trailing edge regions to be vented toward the zones of relatively low pressure in the mid-section of the airfoil. This porous configuration increases instability of laminar flow due to blowing. This airfoil device can cause tripping of the boundary layer rather than its laminarization.

OBJECTS AND SUMMARY OF THE INVENTION

It is, therefore, a principal object of the present invention to provide a method for laminar flow control on hypersonic body surfaces to decrease aerodynamic drag of hypersonic vehicles.

It is another object to provide a method for laminar flow control on hypersonic body surfaces to reduce the thermal loads.

According to the invention, a method is provided for hypersonic laminar flow control using the effect of flow stabilization by an ultrasonically transparent coating. In one embodiment, the coating is made from a porous material of a regular structure of openings in the body surface. Such pores can be made in a metal skin of a hypersonic vehicle. In another embodiment the porous coating has a random distribution of pore shape and orientation. Such a coating can be made from materials of existing thermal protection systems. In both embodiments, the pore cross-sectional size should be much less (e.g. 10% or less) than the boundary layer thickness. This prevents the coating roughness from tripping the boundary layer. Moreover, flow disturbances penetrate into the microholes and dissipate inside them due to viscosity and thermal conductivity. Absorption of the disturbance energy by the coating material stabilizes flow disturbances and eventually leads to the laminar-turbulent transition delay.

In contrast to the method proposed in the U.S. Pat. No. 4,802,642, the present method is passive and does not need disturbance generators and their tuning. Furthermore, the '642 method involves injecting acoustic energy into the boundary layer rather than absorbing it as in the present method. In summary, the ultrasonically transparent coating can absorb the disturbance energy of the frequency band, stabilize the boundary layer flow of the present invention, and eventually delay transition.

Other objects, advantages and novel features of the present invention will become apparent from the following detailed description of the invention when considered in conjunction with the accompanying drawings.

BRIEF DESCRIPTION OF THE DRAWINGS

FIG. 4a is a side view of a sharp flat plate theoretical model of a section over the vehicle, depicting an example of a porous coating with a regular opening pattern and spacing, s. FIG. 4b is a top view of the absorptive coating illustrated in FIG. 4a.

FIG. 6 is a graph of the disturbance growth rate $\sigma$ seen as function of the Reynolds number R illustrating the flow stabilization by a porous coating for various pore radii.

FIG. 9 is a flow chart showing the use of optimization algorithms in the development of an absorptive coating design.

The same elements or parts throughout the figures are designated by the same reference characters.

DESCRIPTION OF THE PREFERRED EMBODIMENT

Figure 1:
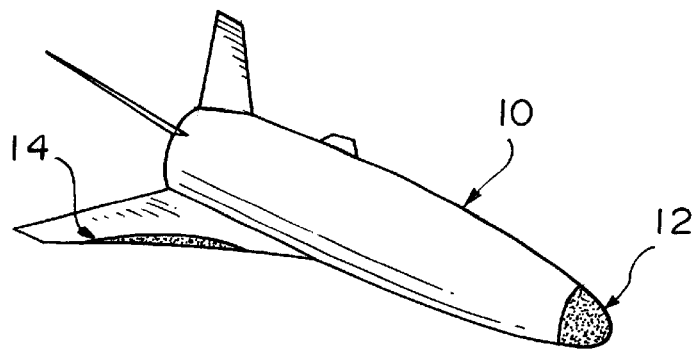
FIG. 1 is a schematic illustration of a hypersonic vehicle covered by an ultrasonically transparent porous coating in accordance with the present invention.

Referring now to the drawings and characters of reference marked thereon, FIG. 1 illustrates a hypersonic reusable launch vehicle, designated generally as 10, having absorbing bodies or wall portions 12, 14, comprising an absorbing wall over selected areas, which requires suppression of boundary layer transition from laminar to turbulent flow. Such boundary layer transition suppression can enhance performance of aircraft and space vehicles and can lead to increased payload, affordability and operational efficiency. The absorbing wall portions 12, 14 may comprise a thermal protection system for the vehicle 10.

Figure 2:
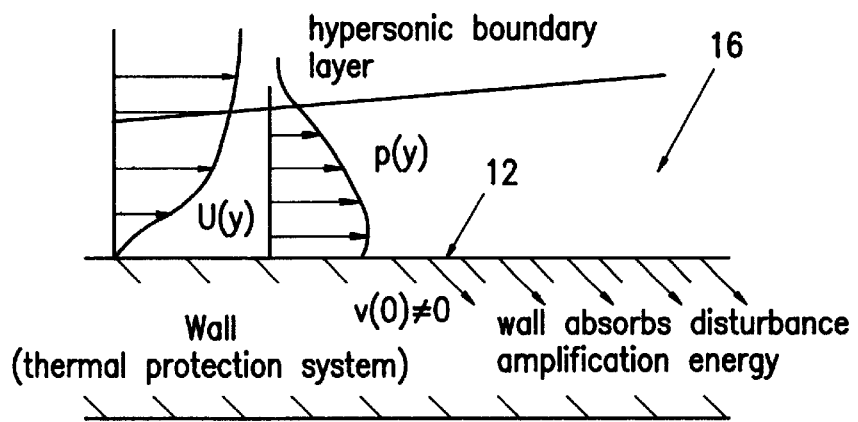
FIG. 2 is a schematic close up of the ultrasonically absorbing porous coating showing the mean flow boundary layer streamwise velocity, U(y), and pressure disturbance amplitude profiles, p(y).

Referring now to FIG. 2, a close-up schematic illustration of a section of an absorbing wall portion 12 or 14 is illustrated. For a hypersonic body, the surface region 12 over which unstable disturbances amplify in a hypersonic boundary layer 16 and causes a laminar-turbulent transition is determined from flow stability analysis or experimental data. The profile U(y) of the horizontal component of the mean flow velocity is illustrated in this figure. The amplitude p(y) of the fluctuation in the pressure is also illustrated. The frequency band of unstable disturbances is roughly estimated using the following expression for the disturbance frequency,f,:

$$f = U/2\delta, \qquad (1)$$

where U is the flow speed at the upper boundary layer edge, and $\delta$ is the boundary layer thickness.

A more accurate estimation of this frequency can be obtained from linear stability calculations. In many practical cases, the unstable disturbance frequency is higher than 50 kHz, which is in the ultrasonic band.

Figure 3:
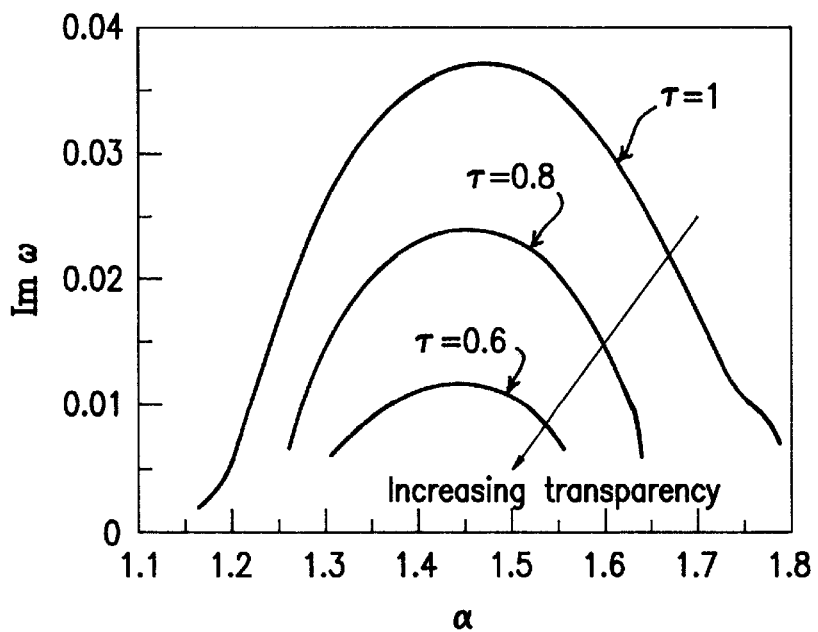
FIG. 3 is a graph of temporal growth rate (Im$\omega$) versus wavelength ($\alpha$) showing the effect of increasing absorption of the surface in reducing amplification of waves, leading to delay of boundary layer transition.

In accordance with the principles of the present invention, in one embodiment, to stabilize these disturbances, the surface region 12 includes an ultrasonically transparent coating which absorbs the flow disturbance energy of the frequency band and does not trip the boundary layer flow. FIG. 3 shows the decrease in the temporal growth rate, Im$\omega$ with increasing transparency, $\tau$, based on a special temporal stability analysis that will be discussed below.

Referring now to FIG. 4a, a sharp flat plate theoretical model of a section over the vehicle 18 is illustrated, having an absorptive coating 20. FIG. 4b is a top view of the absorptive coating 20, having regularly (uniformly) spaced holes 22 of spacing s. Holes 22 are cylindrical blind microholes, which are normal to the body surface. The hole pattern parameters are, for this example:

r*—pore radius;

h*—pore length;

n—porosity coefficient equal to the ratio of the total cross-sectional area of all pores to total surface area.

Figure 5:
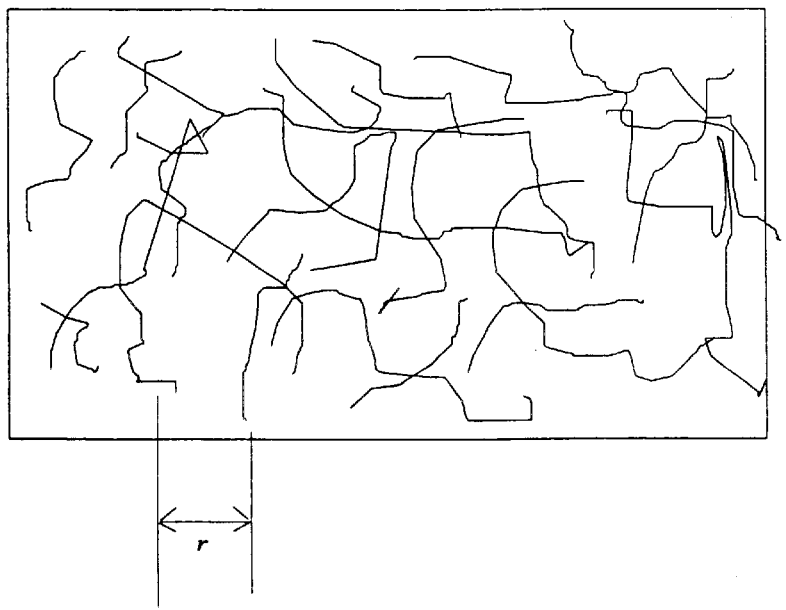
FIG. 5 is a top view of an alternate porous coating with an irregular porosity pattern, the openings being, for example, the interstices between fibers of a thermal protection system (TPS).

By contrast to the aforementioned regular porous structure, the porous material structure may have random distributions of pore shape and orientation. Such a random microstructure is typical of thermal protection system (TPS) materials used on hypersonic vehicle surfaces. A schematic of the microstructure of a TPS having irregular pores in accordance with the principles of the present invention is shown in FIG. 5. In this random case, the aforementioned parameters should be treated as average values.

Since the coating should not trip the boundary layer flow, the pore radius must be much less than the boundary layer displacement thickness $\delta^*$. For example, in the regular case n=0.5, and the dimensional pore radius r* should be equal to 0.05 $\delta^*$. In this case, the roughness effect produced by pores is negligible. However, pressure waves induced by flow instability penetrate into the microholes and dissipate due to gas viscosity and thermal conductivity of the pore walls. Instead of the standard boundary condition for the vertical velocity on a solid wall, $v_W=0$, the following (Darcy law) relation applies on the absorptive coating surface $$v_W = A p_W \qquad (2)$$

where $v_W$ is the vertical velocity disturbance amplitude on the surface;

$p_W$ is the pressure disturbance amplitude on the surface; and

A is the absorption coefficient.

The absorption coefficient depends on the coating structure parameters and can be expressed as $$A = v_w/p_w = -(1/Z_0)th(\Lambda h) \qquad (3)$$

where the characteristic impedance $Z_0$ and the propagation constant $\Lambda$ are functions of the disturbance frequency, pore radius, density and viscosity of the gas within the microhole as well as flow parameters on the coating surface. The values of $Z_0$ and $\Lambda$ can be estimated from the theory of acoustic wave propagation in thin and long tubes. Since ultrasonic external flow disturbances penetrate into the microholes and dissipate inside them, the absorption coefficient is negative.

If the porous coating has an irregular complicated structure, then the absorption coefficient can be roughly estimated from the following expression $$A = -\frac{T_w}{c} \sqrt{\frac{M^2 c^2}{T_w} - 1} \left( \frac{1-\tau}{1+\tau} \right), \text{Real}(A) < 0 \qquad (4)$$

where:

$T_W$ is the coating temperature in units of the flow temperature at the upper boundary layer edge;

c is the disturbance phase speed in units of the flow velocity at the upper boundary layer edge;

M is the Mach number at the upper boundary layer edge; and $\tau$ is the reflection coefficient which is the ratio of the incident pressure wave amplitude to the reflected one.

The reflection coefficient $\tau$ is a function of the porous coating structure and disturbance frequency. It can be measured in the laboratory by suitable bench experiments.

The flow stabilization effect produced by a porous coating is estimated from linear stability analysis using the boundary condition (Equation 2). As an example, FIG. 6 shows the disturbance growth rate $\sigma$ as a function of the displacement thickness Reynolds number R for the unstable wave of non-dimensional frequency $F=\pi v f/U^2=2.8\times 10^{-4}$. The Mach number M is equal to 6 at the upper boundary layer edge; the wall temperature $T_W$ is equal to $0.2 T_{ad}$, where $T_{ad}$ is the surface temperature on an adiabatic wall. Calculations were performed for a porous layer of thickness $h^*=0.3\delta^*$ and porosity $n=0.5$, at various values of the pore radii $r=r^*/\delta^*$, where the stars on r and h denote dimensional values. The porous layer causes strong stabilization of the boundary layer flow. In particular, pores of radius $r=0.04$ reduce the growth rate by a factor of 4 compared to the solid wall case.

Figure 7:
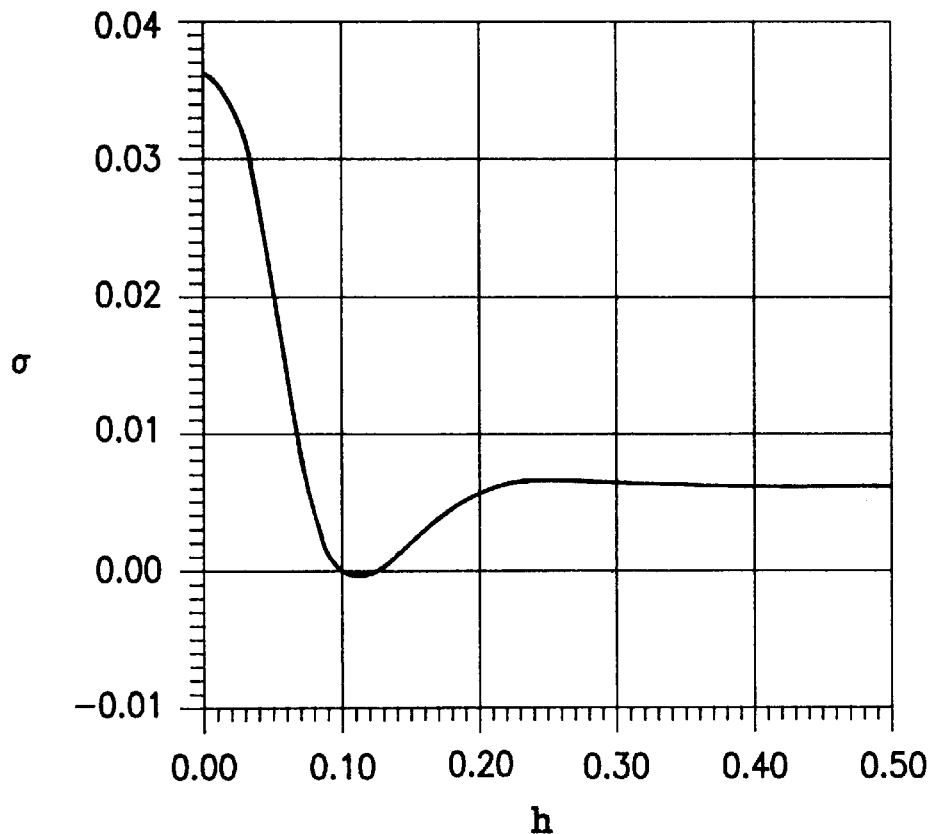
FIG. 7 is a graph of the instability growth rate as a function of the porous layer thickness, h, illustrating the effect of h on the growth rate.

In FIG. 7, the instability growth rate $\sigma$ is shown as a function of the porous layer thickness $h=h^*/\delta^*$, for $n=0.5$, $r=0.03$, $R=4000$, and $F=3\times10^{-4}$. The limit of a thick coating $h\Lambda\to\infty$, is achieved at the relatively small value of $h=0.3$, that is due to strong damping of sound waves in thin pores. It is also seen that there is an optimal coating thickness, $h=0.11$, for which the stabilization effect is strongest. Transition delay caused by the porous coating can be predicted by the $e^N$ method of Van Ingen and Smith with stability calculations or determined in experiments by comparison of the transition location on models with and without a porous layer. As a rough approximation, the transition Reynolds number $R_{tr}$ is universally proportional to the disturbance growth rate. According to the data shown in FIG. 6, the porous coating with non-dimensional pore radius $r=0.04$ and porosity $n=0.5$ can increase the transition Reynolds number $R_{tr}$ by a factor of 4. Such a delay of transition can essentially reduce the aerodynamic drag and thermal loads on hypersonic vehicle surfaces.

The openings may be non-circular and consist of regular patterns defined by a specific functional form for their spatial distributions of shape, spacing and depth that provide maximum transition delay.

Figure 8:
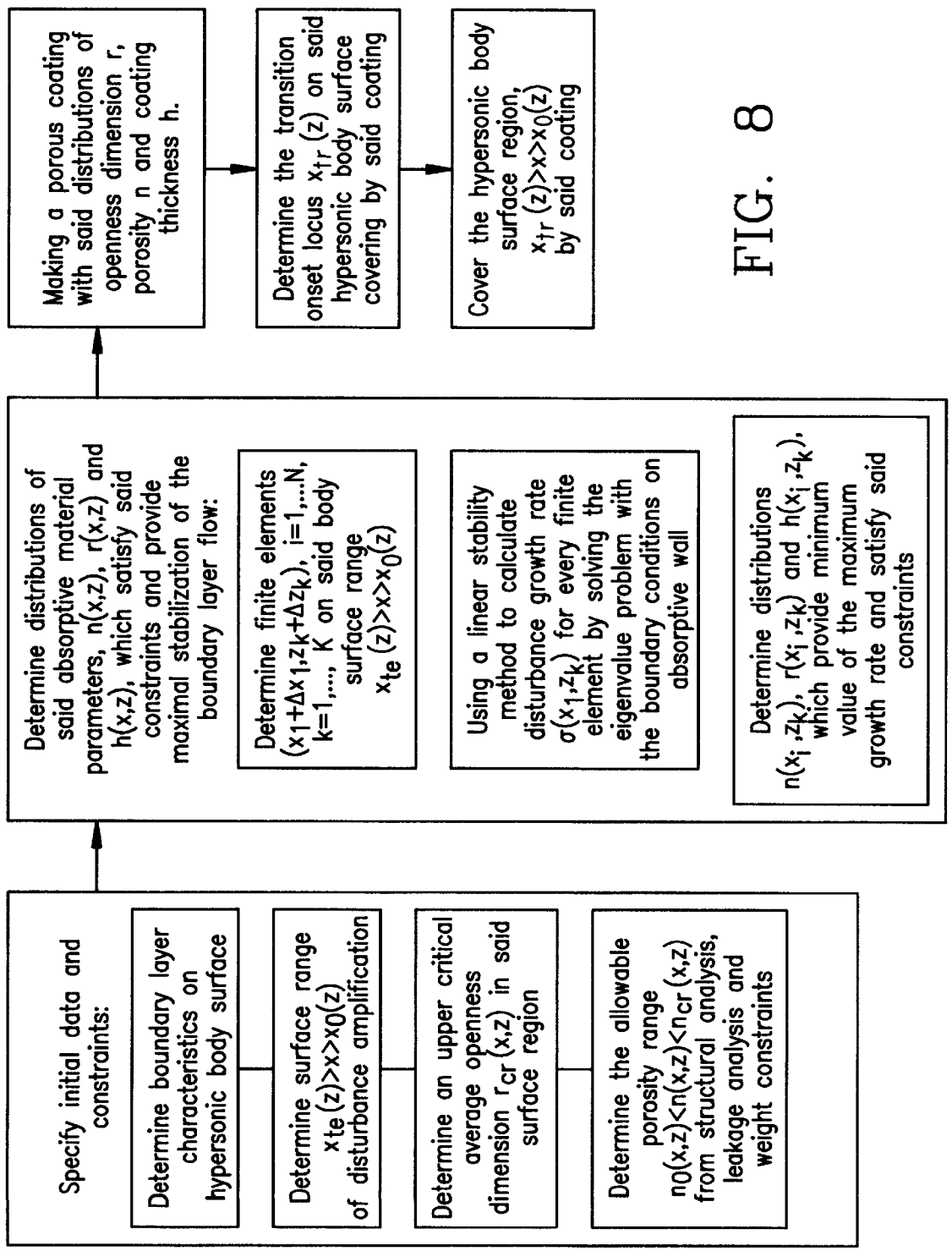
FIG. 8 is a flow chart diagramming the steps performed in developing an absorptive coating design.

Procedures for designing the hole parameters are shown in the flow charts of FIGS. 8 and 9. The first block of boxes in FIG. 8 comprises the steps of determining initial data and constraints required for the absorptive coating design. Characteristics of the laminar boundary layer flow can be determined using a standard boundary layer code, such as LBL, which provides mean flow profiles and their gradients. The body surface range, $x_0(z)<x<x_{te}(z)$, where disturbances amplify downstream, is determined from stability analysis of the laminar boundary layer on a non-absorptive wall. Its upper limit, $x_{te}$, corresponds to the body trailing edge, and its lower limit, $x_0$, is the neutral stability locus, which is determined by solving an eigenvalue problem comprising the stability equation system with non-slip boundary conditions on a non-absorptive wall, $y=0$, i.e., $$u(x,O,z)=v(x,O,z)=0 \quad (5)$$

Here, u, v and w are respectively x,y and z components of the disturbance velocity. This eigenvalue problem can be solved using a standard stability code such as STABLE3.

The maximum critical average openness dimension, $r_{cr}$, (x,z), at which the boundary layer flow is tripped by openness, can be determined from existing experimental data. For example, critical sizes of holes and slots can be estimated using the Goldsmith criteria.

The absorptive coating on a hypersonic vehicle surface is designed to meet structural, weight and leakage constraints. Typical structural constraints involve restrictions on the torsional and bending stresses in wings. These stresses can be evaluated from finite element computer codes. Weight restrictions arise from the need to achieve performance targets and can be evaluated with empirical correlations and statistical methods as well as other techniques. Leakage constraints relate to the porosity being small enough such that water and other liquids such as fuel will be retained in the hypersonic body. These constraints lead to lower and upper limits on the coating porosity n. The second block of boxes in FIG. 8 relates to determining such distributions of the absorptive material parameters n(x,z), r(x,z) and h(x,z), which satisfy the constraints and provide maximum stabilization of the boundary layer flow.

The body surface range, $x_0(z)<x<x_{te}(z)$, is subdivided into finite elements $$(x+\Delta x_i, z_k+\Delta z_k), i=1,\ldots N, k=1,\ldots K.$$

Their size should be much smaller than the body size and much larger than the local boundary layer displacement thickness. For every finite element, the local disturbance growth rate $\sigma(x_i,z_k)$ is calculated as a function of the frequency $\omega$ in the unstable frequency range $\omega\in\Omega_{i,k}$ and the absorptive material parameters $n(x_i,z_k)$, $r(x_i,z_k)$ and $h(x_i,z_k)$. These calculations are performed using a linear stability method that solves an eigenvalue problem of the stability equation system with the boundary conditions on an absorptive wall $$u(x,O,z)=w(x,O,z)=0, \quad (6a)$$

$$v(x,O,z)=Ap(x,O,z), \quad (6b)$$

where the absorption coefficient A can be estimated from Eq. (3) using the theory of sound wave propagation in thin and long tubes. The linear stability method is to modify a standard stability code such as STABLE3 from using conditions (5) to one that uses conditions (6). Results of these calculations are used to determine such local characteristics $n(x_i,z_k)$, $r(x_i,z_k)$ and $h(x_i,z_k)$ which provide a minimum value of the maximum growth rate $\sigma_m(x_i,z_k)=$ $$\max_{\omega\in\Omega_{i,k}} \sigma$$

$(x_i,z_k,\omega)$. The transition onset locus, $x_{tr}(z)$ on the body surface covered by the absorptive coating with optimal distributions $n(x_i,z_k)$, $r(x_i,z_k)$ and $h(x_i,z_k)$, can be determined from experiment or estimated using the $e^N$ method of Van Ingen and Smith. Finally, the hypersonic body surface, $x_0(z)<x(z)<x_{tr}(z)$ is covered by the absorptive coating.

Referring now to FIG. 9, other optimal distributions of the absorptive material parameters $n(x_i,z_k)$, $r(x_i,z_k)$ and $h(x_i,z_k)$ can be found from the condition that the porous coating provides maximum delay of the transition onset locus $x_{tr}(z)$. Since unstable disturbances propagate in the boundary layer approximately along streamlines located at the upper boundary layer edge, the search of said parameters is performed along these streamlines.

The body surface range, $x_{te}(z) \geq x(z) > x_0(z)$, is covered by a streamline pattern, $x_s(i,z) i=1, 2, \ldots, N$ where a streamline $x_s(i,z)$ starts from the neutral point $x_0(i,z)$.

For every streamline, the absorptive coating parameters are considered as functions of a distance $s_i$ measured along a streamline from the neutral point, i.e. $n_i=n_i(S_i)$, $r_i=r_i(s_i)$ $h_i=h_i(s_i)$. These functions are determined from the following optimization problem:

Find such functions $h_i(s_i)$, $n_i(s_i)$ and $r_i(s_i)$, which satisfy the constraints $$n_{0,i}(s_i) \leq n_i(s_i) \leq n_{cr,i}(s_i),\ r_{0,i}(s_i) \leq r_i(s_i) \leq r_{cr,i}(s_i),\ h_{0,i}(s_i) < h_i(s_i) \leq h_{cr,i}(s_i),\ n_{0,i}(s_i < n_i(s_i) < n_{cr,i}(s_i),$$

where the lower limits and critical value $h_{cr,i}$ are determined from structural analysis, leakage analysis and weight constraints. The solution of this optimization problem can be obtained by application of the Schittkowski nonlinear programming algorithm such as that implemented in the IMSL 11.0 code NCONF. Other procedures may also be used such as stimulated annealing, adjoint methods, variational techniques and genetic algorithms.

Obviously, many modifications and variations of the present invention are possible in light of the above teachings. It is therefore to be understood that, within the scope of the appended claims, the invention may be practiced otherwise than as specifically described. What is claimed and desired to be secured by Letters Patent of the United States is:

We claim:

1. A body capable of providing laminar flow control while exposed to a hypersonic flow, a surface of said body and said hypersonic flow defining a hypersonic boundary layer, said body comprising:
an absorptive material for providing ultrasonic absorption of acoustic energy while exposed to hypersonic flow, said absorptive material having an absorption coefficient (A) such that disturbances in the hypersonic boundary layer are stabilized, said absorptive material providing acoustic absorption due to dissipation mechanisms.

2. The body of the claim 1, wherein said disturbances comprise Mack's second mode disturbances.

3. The body of claim 1, wherein said absorptive material comprises a porous material.

4. The body of claim 1, wherein said absorptive material comprises a plurality of spaced openings formed therein.

5. The body of claim 1, wherein said absorptive material comprises slots formed therein.

6. The body of claim 4, wherein the configuration of said plurality of openings is developed from the solution of a hypersonic linear stability eigenproblem subject to a Darcy law boundary condition given by:

$$v_w = A p_w \quad (2)$$

where
$v_w$ is the vertical velocity disturbance amplitude on the surface;
$p_w$ is the pressure disturbance amplitude on the surface; and
A is the absorption coefficient.

7. The body of claim 6 wherein said absorption coefficient (A) is defined by the following equation:

$$A = -\frac{T_w}{c} \sqrt{\frac{M^2 c^2}{T_w} - 1} \left( \frac{1-\tau}{1+\tau} \right), \text{Real}(A) < 0 \quad (2)$$

where:
$T_w$ is the coating temperature in units of the flow temperature at the boundary layer edge;
c is the disturbance phase speed in units of the flow velocity at the boundary layer edge;
M is the Mach number at the boundary layer edge; and
$\tau$ is the reflection coefficient, which is the ratio of the incident pressure wave amplitude to the reflected one.

8. The body of claim 4, wherein said absorption coefficient A is estimated from the theory of acoustic wave propagation in thin and long tubes.

9. The body of claim 1, wherein said absorptive material comprises a thermal protection system.

10. The body of claim 3, wherein said absorptive material has a regular porosity.

11. The body of claim 3, wherein said absorptive material has random porosity.

12. The body of claim 3, wherein said absorptive material is microporous.

13. The body of claim 3, wherein said absorptive material is macroporous.

14. The body of claim 1, wherein said absorptive material comprises a plurality of spaced holes formed therein.

15. A coating for providing laminar flow control along a surface exposed to a hypersonic flow, said flow defining a hypersonic boundary layer, said coating comprising:
a layer of ultrasonically absorptive material applicable to a surface exposed to hypersonic flow, said absorptive material having an absorption coefficient (A) such that disturbances in the hypersonic boundary layer are stabilized.

16. A method of providing laminar flow control on a hypersonic body, comprising the steps of:
a) specifying initial data and constraints on a laminar flow control material, comprising the steps of:
i) determining the laminar boundary layer characteristics on a surface of a hypersonic body;
ii) determining a surface range, $x_{te}(z) \geq x(z) > x_0(z)$, where x is the downstream coordinate along the body surface, z is a coordinate perpendicular to the x-direction, $x_0(z)$ is the locus of neutral stability and $x_{te}(z)$ is the trailing edge of said hypersonic body, said surface range being where unstable disturbances amplify in a hypersonic boundary layer downstream leading to laminar-turbulent transition, said locus of neutral stability being determined by solving an eigenvalue problem comprising a stability equation system using said determination of laminar boundary layer characteristics, said stability equation system subject to non-slip boundary conditions on the wall, y=0, where y is a coordinate normal to said hypersonic body surface, $$u(x,O,z)=0, \; v(x,O,z)=0, \; w(x,O,z)=0 \quad (1)$$

where u is the component of the flow velocity in the x-direction, v is the component of the flow velocity in the y-direction and w is the component of the flow velocity in the z-direction;
iii) determining from structural analysis, leakage analysis and weight constraints the allowable porosity range, $n_0(x,z) \leq n(x,z) \leq n_{cr}(x,z)$, for $x(z) > x_0(z)$, where n=total area of all openness/total area and $n_{cr}(x,z)$ is the maximum allowable porosity;
iv) determining a maximum critical average openness dimension, $r_{cr}(x,z)$ for the characteristic opening width, r(x,z), in said surface region, $x(z) > x_0(z)$, said $r_{cr}(x,z)$ being defined in units of the boundary layer displacement thickness, $\delta^*(x,z)$, starting from where the boundary layer is tripped; and
v) determining a maximum depth, $h_{cr}(x,z)$ for the characteristic depth, h(x,z);
b) determining distributions of said absorptive material parameters, n(x,z), r(x,z) and h(x,z) on said hypersonic body surface range, $x_{te}(z) \geq x(z) > x_0(z)$, which satisfy said initial data and constraints and provide maximum stabilization of the boundary layer flow on said hypersonic body, comprising the steps of:
i) determining finite elements $(x_i + \Delta x_i, z_k + \Delta z_k)$ on said body surface range, $x_0(z) \leq x(z) \leq x_{te}(z)$, where i=1, . . . , N and k=1, . . . , K are surface grid indices;
ii) using a linear stability method to calculate the growth rate $\sigma(x_i, z_k, \omega)$ of said disturbances in the unstable band of the disturbance frequency, $\omega \in \Omega_{i,k}$, by solving an eigenvalue problem of the stability equation with the boundary conditions on said surface, y=0, $$u(x,O,z)=0, \ w(x,O,z)=0 \qquad (2)$$

$$v(x,O,z)=Ap(x,O,z) \qquad (3)$$

where p is the disturbance pressure and where the absorption coefficient, A, depends on the disturbance frequency, $\omega$, the opening parameters $n_{i,k}=n(x_i,z_k)$, $r_{i,k}=r(x_i,z_k)$ and the opening depth $h_{i,k}=h(x_i,z_k)$ as well as said body surface characteristics, and is determined using the theory of sound wave propagation in a thin and long tube; and iii) using said disturbance growth rate to determine said porous material parameters $n_{i,k}$, $r_{i,k}$, and $h_{i,k}$, which provide a minimum value of the maximum growth rate $\sigma_m(x_i,z_k)=$ $$\max_{\omega \in \Omega_{i,k}}$$

$\sigma(x_i,z_k,\omega)$ and which satisfy said constraints;

c) making a porous coating of said openness dimension distribution $r_{i,k}$, porosity distribution $n_{i,k}$ and thickness distribution $h_{i,k}$;

d) using said distributions of porous coating characteristics to determine the transition onset locus $x_{tr}$ (z) on said hypersonic body surface to be covered by said coating; and e) covering said hypersonic body surface region, $x_0(z)<x(z)<x_{tr}(z)$, by said coating.

17. The method of claim 16, wherein said step of determining a maximum critical average openness dimension, $r_{cr}(x,z)$, comprises using the Goldsmith criterion.

18. The method of claim 16, wherein said step of determining the transition onset locus $x_{tr}$ (z) comprises using the $e^N$ method of Van Ingen and Smith.

19. A method of providing laminar flow control on a hypersonic body, comprising the steps of:
 a) specifying initial data and constraints on a laminar flow control material, comprising the steps of:
  i) determining the laminar boundary layer characteristics on a surface of a hypersonic body;
  ii) determining a surface range, $x_{te}(z) \geq x(z) > x_0(z)$, where x is the downstream coordinate along the body surface, z is a coordinate perpendicular to the x-direction, $x_0(z)$ is the locus of neutral stability and $x_{te}$ (z) is the trailing edge of said hypersonic body, said surface range being where unstable disturbances amplify in a hypersonic boundary layer downstream leading to laminar-turbulent transition, said locus of neutral stability being determined by solving an eigenvalue problem comprising a stability equation system using said determination of laminar boundary layer characteristics, said stability equation system subject to non-slip boundary conditions on the wall, y=0, where y is a coordinate normal to said hypersonic body surface, $$u(x,O,z)=0, \ v(x,O,z)=0, \ w(x,O,z)=0 \qquad (1)$$

where u is the component of the flow velocity in the x-direction, v is the component of the flow velocity in the y-direction and w is the component of the flow velocity in the z-direction;
  iii) determining from structural analysis, leakage analysis and weight constraints the allowable porosity range, $n_0(x,z) \leq n(x,z) \leq n_{cr}(x,z)$, for $x(z)>x_0(z)$, where n=total area of all openness/total area and $n_{cr}(x,z)$ is the maximum allowable porosity;
  iv) determining a maximum critical average openness dimension, $r_{cr}(x,z)$ for the characteristic opening width, r(x,z), in said surface region, $x(z)>x_0(z)$, said $r_{cr}(x,z)$ being defined in units of the boundary layer displacement thickness, $\delta^*(x,z)$, starting from where the boundary layer is tripped; and
  v) determining a maximum depth, $h_{cr}$ (x,z) for the characteristic depth, h(x,z);
 b) determining distributions of said absorptive material parameters, n(x,z), r(x,z) and h(x,z) on said hypersonic body surface range, $x_{te}(z) \leq x(z) > x_0(z)$, which satisfy said initial data and constraints and provide maximum transition delay of the boundary layer flow on said hypersonic body, comprising the steps of:
  i) determining a family of streamlines $x_s(i,z)$ at the upper boundary layer edge starting from said neutral stability points $x_0(z_i)$, i=1, 2, . . . , N ; and
  ii) determining distributions of an absorptive coating opening depth $h_i(s_i)$, porosity $n_i(s_i)$ and pore dimension $r_i(s_i)$ along every said streamline $x_s(i,z)$, where $s_i$ is a distance measured along said streamline starting from said neutral stability point, by solving the following optimization problem:
   find such functions $h_i(s_i)$, $n_i(s_i)$ and $r_i(s_i)$, which satisfy the constraints $$n_{0,i}(s_i) \leq n_i(s_i) \leq n_{cr,i}(s_i), \ r_{0,i}(s_i) \leq r_i(s_i) \leq r_{cr,i}(s_i), \ h_{0,i}(s_i) > h_i(s_i) \leq h_{cr,i}(s_i),$$

where the lower limits $n_{0,i}$, $r_{0,i}$ and $h_{0,i}$ as the well as critical value $h_{cr,i}$ are determined from structural analysis, leakage analysis and weight constraints as well as critical values $n_{cr,i}$, $r_{cr,i}$ being determined using step(a), above; and
  iii) using a linear stability method to calculate growth rate $\sigma(x_i,z_k,\omega)$ of said disturbances in the unstable band of the disturbance frequency, $\omega \in \Omega_{i,k}$, by solving an value problem of the stability equation with the boundary conditions on said surface, y=0, $$u(x,O,z)=0, \ w(x,O,z)=0 \qquad (2)$$

$$v(x,O,z)=Ap(x,O,z) \qquad (3)$$

where p is the disturbance pressure and where the absorption coefficient, A, depends on the disturbance frequency, $\omega$, the opening parameters $n_{i,k}=n(x_i,z_k)$, $r_{i,k}=r(x_i,z_k)$ the opening depth $h_{i,k}=h(x_i,z_k)$ as well as said boundary flow characteristics, and can be determined using the theory of sound wave propagation in a thin and long tube; and
 c) making a porous coating of said openness dimension distribution $r_{i,k}$, porosity distribution $n_{i,k}$ and thickness distribution $h_{i,k}$;
 d) using said distributions of porous coating characteristics to determine the transition onset locus $x_{tr}$ (z) on said hypersonic body surface to be covered by said coating; and
 e) covering said hypersonic body surface region, $x_0(z)<x(z)<x_{tr}(z)$, by said coating.

* * * * *